US005788050A

United States Patent [19]
Mojden et al.

[11] Patent Number: 5,788,050
[45] Date of Patent: Aug. 4, 1998

[54] ADJUSTABLE CAN END COUNTING APPARATUS

[75] Inventors: Andrew E. Mojden, Hinsdale; Paul M. Ross, Riverside, both of Ill.

[73] Assignee: Fleetwood Systems, Inc., Romeoville, Ill.

[21] Appl. No.: 587,959

[22] Filed: Jan. 17, 1996

[51] Int. Cl.$^6$ .................................................. B65G 47/26
[52] U.S. Cl. ...................... 198/419.1; 198/625; 414/796; 414/798.9
[58] Field of Search ................ 198/467.1, 459.4, 198/625, 419.1; 414/796, 796.1, 797.7, 798.9

[56] References Cited

U.S. PATENT DOCUMENTS

| | | | |
|---|---|---|---|
| 4,260,311 | 4/1981 | Hanses | 198/625 |
| 4,605,047 | 8/1986 | Bausch et al. | 198/625 |
| 5,107,978 | 4/1992 | Andrew | 198/625 |
| 5,163,073 | 11/1992 | Chasteen et al. | |
| 5,622,248 | 4/1997 | Villaverde et al. | 198/625 |

*Primary Examiner*—Joseph E. Valenza
*Attorney, Agent, or Firm*—Trexler, Bushnell, Giangiorgi & Blackstone, Ltd.

[57] ABSTRACT

An apparatus for moving a series of disk-like articles, such as can ends. The apparatus includes an article moving assembly, an article counting system and an article separating assembly. The article moving assembly includes an adjustment assembly for adjusting the article moving assembly to accommodate a range of can end diameters moving through a path of travel. The can end counting system includes a sensor which detects the rotation of a component of the can end moving assembly. The sensor is coupled to a control device which receives sensing information from the sensor to determine the number of can ends passing through the end moving assembly. The separator assembly includes a blade attached to an actuation assembly. The blade is inserted a sufficient distance to contact an edge portion of an article and the actuation assembly moves the contacted group of articles by moving the blade. The blade includes a contour which generally corresponds to a contour of the edge portion of the article thereby minimizing the contact and the possibility for interfering with the integrity of the can end surfaces.

9 Claims, 5 Drawing Sheets

ADJUSTABLE CAN END COUNTING APPARATUS

BACKGROUND

The present invention relates to an apparatus for receiving, handling, and moving a plurality of disk-like articles, such as can ends. More particularly, the present invention relates to an apparatus which handles a stream of articles by receiving the articles, moving the articles, separating the articles, counting the articles while separated, and restacking and moving the article along a conveyor.

The apparatus of the present invention may find utility and other applications, however, the disclosure provided herein will make particular reference to the handling of the container ends during fabrication operations as well as subsequent use of such container ends during packaging operations. For the manufacture and filling of containers, for example, beverage containers, vast numbers of container ends are required. The present fabrication and filling operations require handling such large quantities of container ends at a high rate of speed in a more or less continuous process. A fabrication or filling facility may contain several lines of can ends streaming to or from various processing steps. Throughout the description of the present invention, groups of container ends generally will be referred to as "sticks of ends" as commonly used in the industry.

By way of background, many fabrication steps may be involved in the fabrication of can ends including stamping or forming, conversion by which the stamped blank is formed into a can end, and, perhaps, application of a pull tab. Additionally, a suitable liner material or coating may be required depending on the type of product which is to be retained in the container. If a liner material or coating is used, a repair may have be effected to seal any nicks or scrapes which may be encountered during the fabrication process. A final step of the fabrication process may involve placing a predetermined number of container ends in a suitable bag or tray.

Before the can ends are bagged or placed into a tray, they may need to be counted. Increasingly, users of can ends require accurately counted can ends for their processing systems. Further, it is important to accurately count the number of can ends produced by the manufacturer of the ends and used by the end user. In this regard, the manufacturer of the can ends benefits from an accurate count by not providing too many or too few can ends to a customer. The end user of the can ends benefits from increased count accuracy by paying only for an accurate number of can ends, neither too few nor too many. Further, the end user of the can end benefits from increased can end count accuracy by improved control over their processing systems.

The end user or filling operation may also involve numerous steps. Initially, the container ends are transported from the fabrication line or from the bag or tray in which they are stored and/or shipped after fabrication to the final assembly process. It should be noted that container ends are often fabricated by one entity (the fabricator) for use by a second entity (the end user). In some circumstances, the fabricator of such container ends may also be the end user. When the fabricator is also the end user, the process operates in a more or less continuous process starting with a raw sheet material which is fabricated, as described hereinabove, to form a container end.

It is also important and desirable to be able to handle a variety of can end diameters. The can end fabricator and end user may have containers of varying sizes. This is especially true when dealing operations having products which are used in domestic as well as international or export markets. For example, beverage containers in the United States may have a diameter which is standardized throughout the United States. However, beverage containers is used in countries outside the United States, for example, Japan, they have a can end diameter which is standardized for that country which is different from the United States standard. As such, it would be highly desirable to provide a can end handling apparatus which can be conveniently and easily adjusted or modified to accommodate can ends of a variety of diameters.

In this regard, it would be desirable for one can end processing system to be employed to produce can ends of one diameter, for example, the United States standard beverage container end, and then allow the operator to adjust various mechanisms throughout the process to accommodate a can end of a different diameter. While most of the handling of the can ends involves moving the can ends through cage tubes or urging the can ends along a pair of guide tracks through such caged tube, at least one step throughout the process is fixed to a specific can end diameter.

More specifically, in the can end counting process a pair of rollers is employed to move or urge the can ends through a path of travel. An example of such apparatus is shown in U.S. Pat. No. 5,163,073 to Chasteen et al. issued Nov. 10, 1992. A pair of rollers is provided having a spiral groove formed on the outside thereof to engage an outside edge portion of a can end to advance it along a path of travel. The can ends enter one end of the counting apparatus, the inflow side, whereupon the rollers capture an edge of a can end and advance it through the path of travel separating it from neighboring can ends. The rollers in the device as shown in Chasteen are fixed and therefore can accommodate only one size of can end diameter. In order to accommodate a different can end diameter, the roller assembly must be replaced. Replacement of the roller assembly can be quite time consuming.

As an additional matter, this can end counting system may encounter some problems such that the sensor may not provide a required degree of accuracy in counting the can end. The sensor counts each individual can end and thus, anything interfering with the sensor may interfere with the accuracy of the can end count. As such, it would be desirable to provide an apparatus which is increases the accuracy of the can end count.

As yet a further matter, during the can end counting operation it may be desirable to separate or transport a group of ends or a stick of ends away from the counting mechanism. As discussed above, certain operations may require that a liner material or coating be used to repair any nicks or scrapes on the can end surfaces which may occur during the fabrication process. Because considerable attention is paid to each can end during the fabrication process, it is desirable to maintain the integrity of the can end during the counting operation.

Some can end counting apparatus may employ an article separator assembly which has a blade for insertion between neighboring can ends. Typically, the blade is inserted between the can ends to a depth of approximately the radius of the can end or the middle of the can end. When the separator knife is inserted to this depth it may interfere with the product contact surface of the can end and thus increases the possibility of nicking or scratching the can end.

Further, such a knife separating assembly may interfere with the opening device or pull tab assembly attached to the can. If the article separator assembly interferes with the integrity of the can end, damage caused thereby may result in further problems later in the process, for example, during the filling operation. If, for example, a pull tab is damaged by a separator knife, when the beverage container is filled and the can end is applied to the container, beverage product will escape from the can end from the damaged area. This may interfere with the operation of the canning process line or decrease the cleanliness as a result of product contacting neighboring filled containers.

As such, it would be highly desirable to provide a can end handling apparatus which has an article separator assembly which does not interfere with the integrity of the can end.

OBJECTS AND SUMMARY

A general object satisfied by the claimed invention is to provide an apparatus for handling disk-like articles such as can ends using an article moving assembly to move such can ends through a path of travel and which includes an adjustment assembly attached to the article moving assembly for adjusting the article moving assembly to handle a range of can end diameters upon making adjustments.

Another object satisfied by the present invention is to provide an apparatus for counting can ends which indirectly counts the can ends to increase the accuracy of the count.

Still a further object satisfied by the present invention is to provide an apparatus for handling can ends which includes a separator assembly having a blade which helps to maintain the integrity of the can end.

Briefly, and in accordance with the foregoing, the present invention envisions an apparatus for moving a series of disk-like articles, such as can ends. The apparatus includes an article moving assembly, an article counting system and an article separating assembly. The article moving assembly includes an adjustment assembly for adjusting the article moving assembly to accommodate a range of can end diameters moving through a path of travel. The can end counting system includes a sensor which detects the rotation of a component of the can end moving assembly. The sensor is coupled to a control device which receives sensing information from the sensor to determine the number of can ends passing through the end moving assembly. The separator assembly includes a blade member attached to an actuation assembly. The blade is inserted a sufficient distance to contact an edge portion of an article and the actuation assembly moves the contacted group of articles by moving the blade member. The blade member includes a contour which generally corresponds to a contour of the edge portion of the article thereby minimizing the contact and the possibility for interfering with the integrity of the can end surfaces.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which.

DESCRIPTION

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Figure 1:
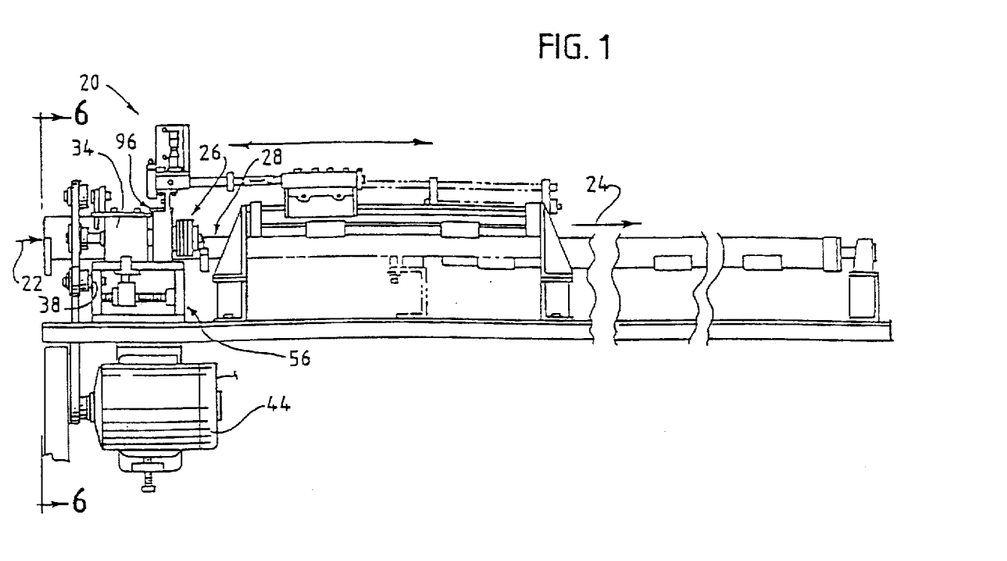
FIG. 1 is a partial fragmentary, side elevational view of an apparatus for receiving and moving a series of disk-like articles including an article moving assembly, an article counting system, and an article separator assembly.

FIG. 1 shows a side elevational view of an apparatus 20 for handling a series of disk-like articles such as can ends during a can-end handling process. Can ends flow into the apparatus 20 on the left side of FIG. 1, the inflow area or path (herein referred to generally by reference numeral 22 and the directional arrow) and flow out from the handling apparatus 20 in an outflow area or path (indicated generally by reference numeral 24 and the directional arrow). The apparatus 20 includes an article moving assembly 26 which receives a series of articles from the inflow path 22 then moves the articles along a path of travel 28 therethrough towards the outflow path 24.

Figure 2:
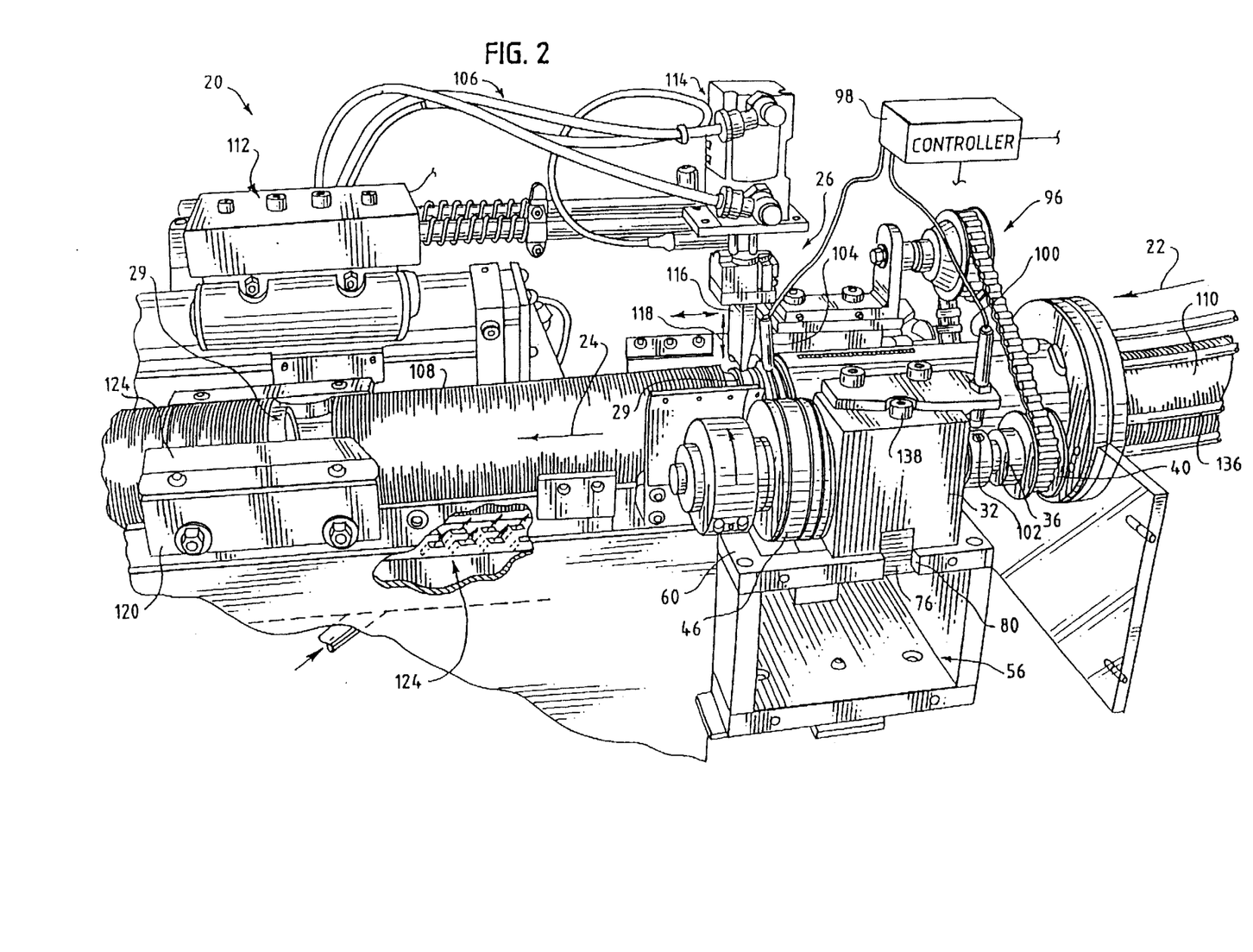
FIG. 2 is an enlarged, front perspective view of the apparatus showing in greater detail the assemblies and systems of the apparatus.

FIG. 2 shows a perspective view of the apparatus 20 taken from an opposite side of that as shown in FIG. 1. FIG. 2 similarly shows the inflow area or path 22, the outflow area or path 24, and the article area moving assembly 26 which receives a series of articles from the inflow path 22 then moves the articles along the path of travel 28 towards the outflow path 24. As such, each article 29 flowing in the stream of articles can be handled to maintain the flow therethrough. The article moving assembly 26 is adjustable to accommodate a variety of article 29 dimensions.

As will be described in greater detail hereinbelow, the article moving assembly 26 includes a pair of bearing blocks (see FIG. 4) 32, 34, each of which rotatably retains a corresponding shaft 36, 38. One end 40, 42 of each shaft 36,38 is attached to a drive mechanism 44 and an opposite end of each shaft 36, 38 has a roller 46, 48, respectively, attached thereto. The drive mechanism 44 is coupled to the ends 40, 42 of the shafts 36, 38 to drive the rollers 46, 48. Each of the rollers 46,48 includes a spiral thread 50 thereon. The thread 50 is sized and dimensioned to engage an edge 127 of the disk-like article or can end 29 (see FIGS. 2 and 7). The spiral or spaced-apart arrangement of the thread 50 on each of the rollers 46, 48 results in separating or spacing neighboring can ends 29 apart as they move between the rollers 46, 48.

As discussed above, it would be beneficial, and the present invention provides, an adjustment assembly 56 for adjusting the distance between the rollers 46, 48. As noted above, the shafts 36, 38 to which the rollers 46, 48 are attached are retained on the bearing blocks 32, 34. The bearing blocks 32,34 provide a stable structure which allow the shafts 36,38 to be rotated by the drive mechanism 44. In order to adjust a dimension between the rollers 46, 48, it is necessary to move the bearing blocks 32, 34 inwardly or outwardly relative to a central axis 58 extending through the adjustment assembly 26. It should be noted that the bearing blocks 32, 34 are positioned on top of a base structure 60.

With further reference to FIGS. 1–6, the adjustment assembly 56 includes a drive device 62 and a pair of linkages 64, 66 coupled to the drive device 62. The linkages 64, 66 are also attached to the bearing blocks 32, 34. The drive device 62 as shown includes a nut 67 engaged with a threaded shaft 68 which is retained on and rotatable relative to the base structure 60. The nut 67 has a bore 70 with internal threads formed thereon and the threaded shaft 68 is a screw having threads engageable with the nut 67. Therefore, rotation of the screw shaft 68 results in movement (as indicated by arrow 72) of the nut 67 along the central axis 58. Movement of the nut 67 moves the linkages 64, 66 attached thereto.

The linkages 64,66 are pivotally attached to the drive device 62 as well as being pivotally attached to the bearing block 32, 34. Pivotal movement of the linkages 64,66 relative to the drive device 62 results in a translation of motion. The translation of motion allows for transverse motion (as indicated by directional arrow 74) of the bearing blocks 32,34 relative to the linear motion 72 of the nut 67 parallel to the central axis 58. As such, operation of the adjustment assembly 56 results in simultaneous and precise movement of the bearing blocks 32, 34 resulting in simultaneous, symmetric and accurate movement of the rollers 46, 48 relative to the central axis 58.

Figure 3:
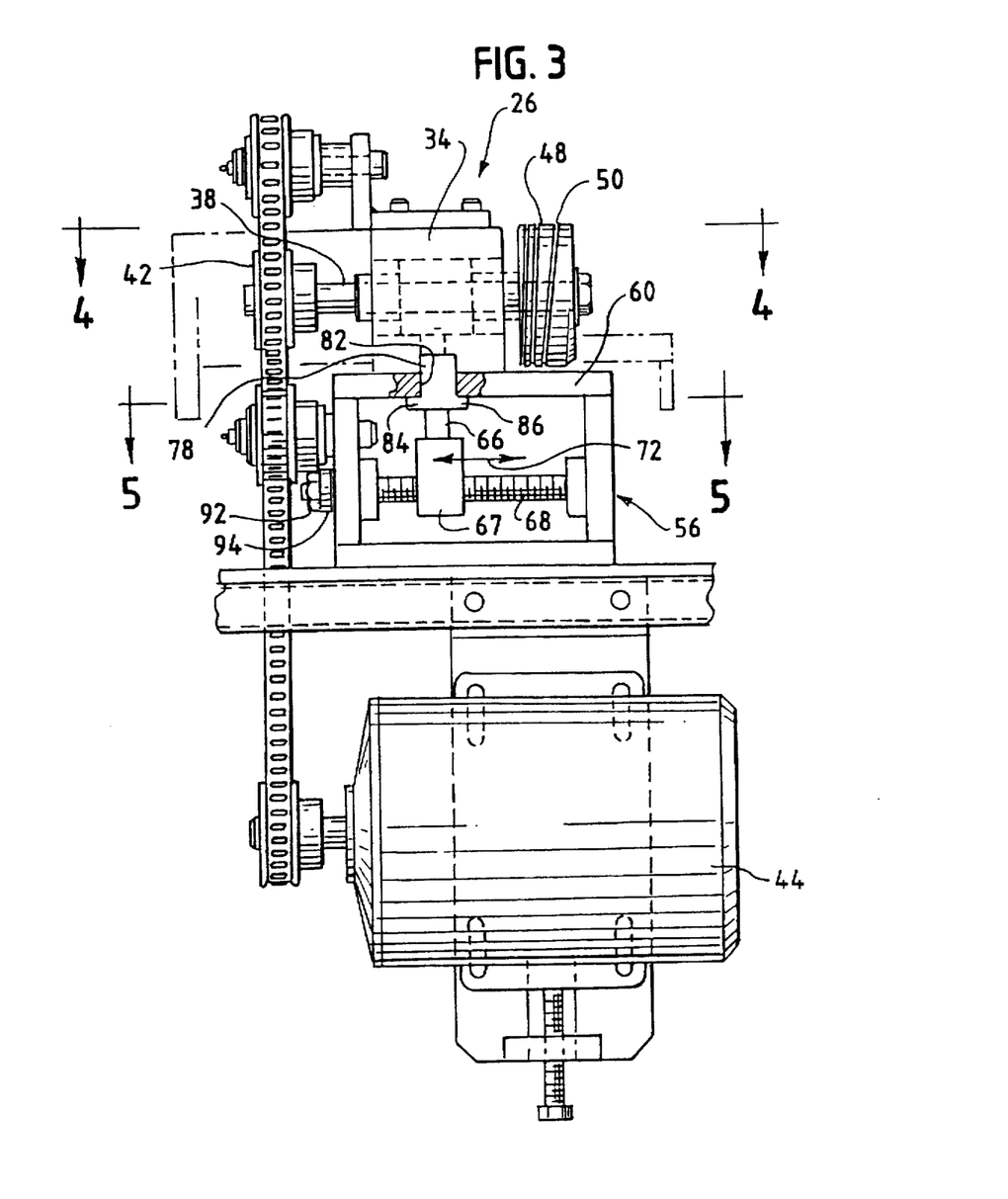
FIG. 3 is an enlarged, partial fragmentary side elevational view of the article moving assembly as shown in FIG. 1 showing in greater detail a bearing block and an adjustment assembly of the apparatus.
Figure 4:
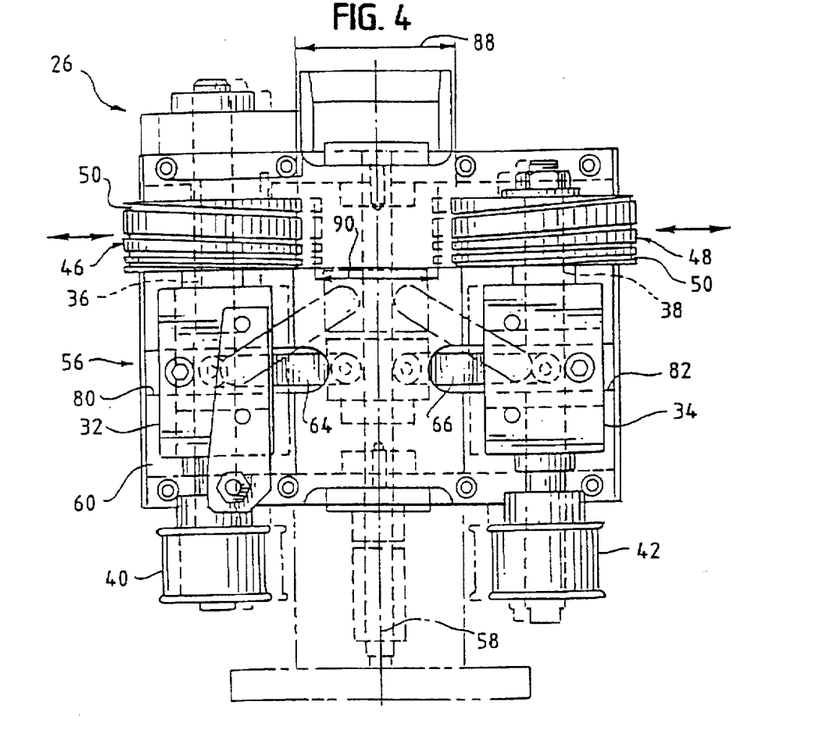
FIG. 4 is a partial fragmentary, top plan view taken along line 4—4 in FIG. 3 of the article moving assembly showing elements of the adjustment assembly and bearing blocks.
Figure 5:
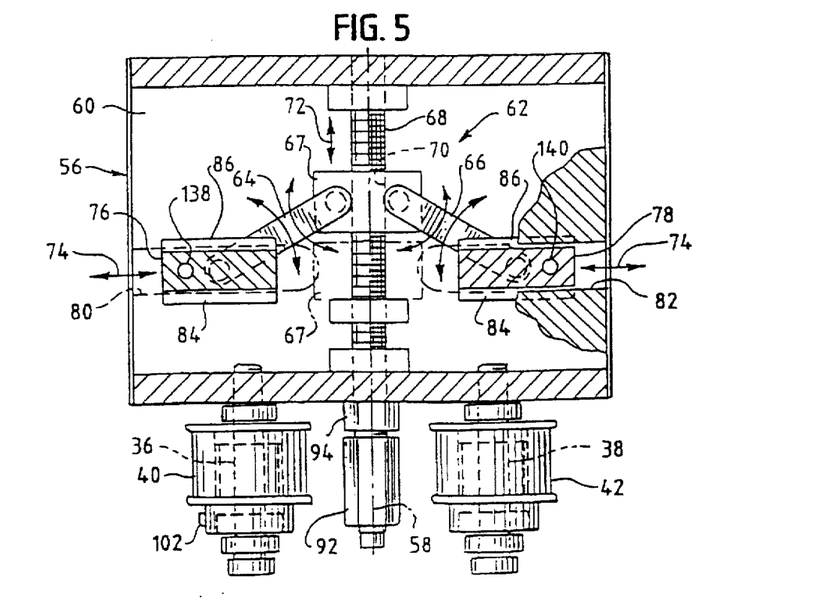
FIG. 5 is a partial fragmentary, cross-sectional, plan view of the article moving assembly, and more particularly the structures associated with the adjustment assembly, taken along line 5—5 in FIG. 3.

The transverse motion 74 is facilitated by the use of key portion 4 key blocks 76, 78 attached to each of the bearing blocks 32, 34. The key blocks 76,78 (as shown in FIGS. 3–5) travel in corresponding keyways 80, 82, respectively. Outwardly extending flanges 84, 86 extend over a surface of the base 60 opposite the corresponding bearing blocks 32, 34. The combination of the key blocks 76, 78 travelling in the key ways 80, 82 and the bearing blocks 32, 34 being attached to the key blocks 76, 78 provide secure, accurate and precise directional movement of the bearing blocks 32, 34 relative to the central axis 58.

In use, the apparatus 20 allows for different diameters of can ends 29 to pass through the path of travel 28 from the inflow end 22 through the outflow end 24. As shown in FIG. 4, the adjustment assembly 56 may be operated to adjust the spacing between the rollers 46, 48 within a range of can end 29 diameters. For example, the rollers 46,48 are adjustable from a position which accommodates a can end 29 having a first diameter (as indicated by dimension arrow 88) and also may be to a position which will accommodate a can end 29 having a second diameter (as indicated by dimension 90) as shown in phantom line.

The adjustment assembly 26 operates by rotating the screw 68 which is retained in the base 60 against movement along the central axis 58 but permitted to rotate relative to the central axis 58. Rotation of the screw 68 at a head 92 moves the nut 62, threadedly engaged with the screw 68, along the central axis 58. The linkages 64, 66 are pivotally attached to the nut 62 and to the key blocks 76, 78. The key blocks 76,78 are attached to the corresponding bearing blocks 32, 34 and travel in the corresponding key ways 80, 82 to limit motion (74) thereof generally only perpendicularly to the central axis 58. As such, when it is necessary to adjust the rollers 46, 48, the head 92 is rotated to operate the adjustment assembly 56. Once a desired diameter adjustment (see, for example, the dimension range 88, 90) is achieved, a lock nut 94 is operated to hold the shaft 68 against rotation.

Figure 6:
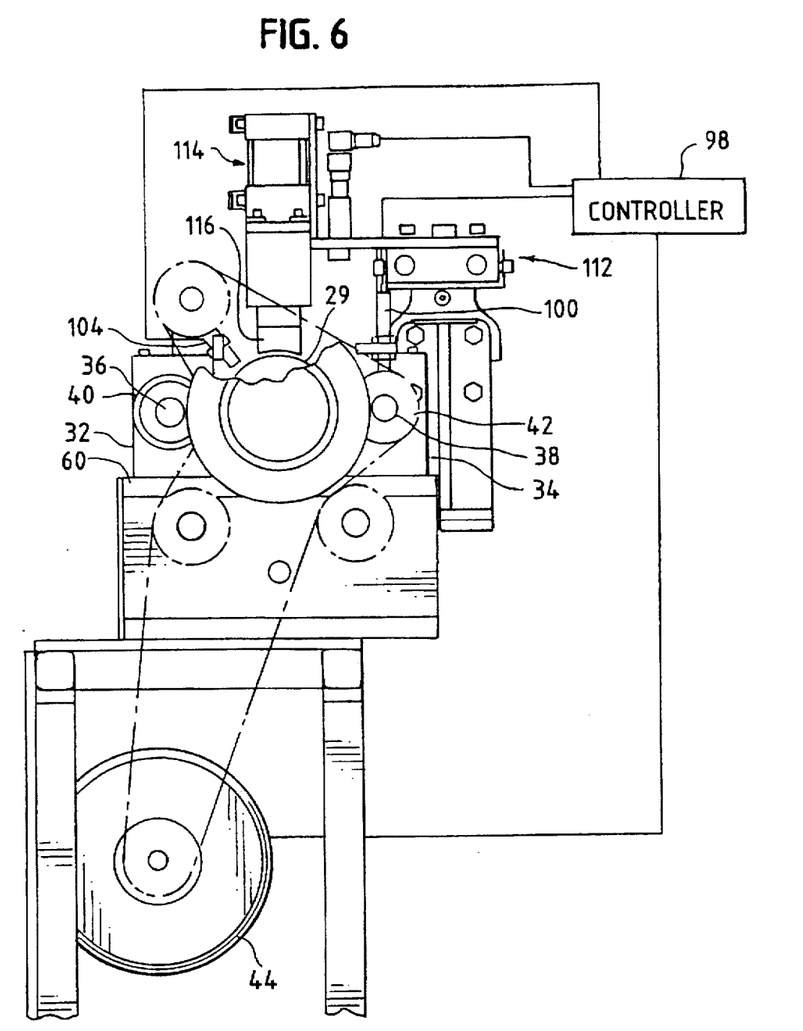
FIG. 6 is an enlarged, partial fragmentary, front elevational view taken along line 6—6 in FIG. 1 showing additional details of the article counting system and the article separating assembly.

The present invention also includes an article counting system 96 which counts articles moving through the article moving assembly 26 by counting the operation of the article moving assembly 26. In this regard, the article counting system 96 of the present invention indirectly counts the actual number of articles passing through the system. The article counting system includes a control device 98 which is coupled to the drive mechanism 44 of the article moving assembly 26 and to a sensor 100. Detectable indicia, shown as a protrusion 102 in the illustrated embodiment, is attached to the shaft 36. The sensor 100 is positioned relative to the shaft 36 in order to sense movement or rotation of the protrusion 102. As the drive mechanism 44 rotates the shaft 36, the protrusion 102 moves past the sensor 100 and indicates rotation of the shaft 36. As shown in FIGS. 2 and 6, a bulk motion sensor 104 is included with the article counting system 96. The bulk motion sensor 104 detects the presence or absence of can ends 29 in the article moving assembly 26. The bulk motion sensor 104 is attached to the control device 98 in order to provide for the detection of the presence or absence of articles to be counted.

In use, the system is primed or set up with articles in the article moving assembly 26. The bulk motion sensor 104 detects the presence or absence of articles therein. As the drive mechanism 44 operates the rollers 46, 48, the shaft 36 is rotated thereby moving the protrusion 102 relative to the sensor 100. The control device 98 senses both the presence of articles (as indicated by the sensor 104) as well as detection of the movement of the protrusion 102. Each rotation of the shaft 36 and movement of the protrusion 102 relative to the sensor 100 indicates a predetermined number of can ends moved by the article assembly 26. In this way, the number of can ends 29 can be accurately counted regardless of the speed of movement of the ends through the article moving assembly 26 because the movement of the ends is controlled by rotation of the rollers 46, 48 which drive the can ends 29 along the path of travel 28. In comparison to the prior art, the present invention does not count the actual can ends but senses the presence of the can ends and then counts the operation of the article moving assembly 26 to calculate the number of can ends moved thereby.

As can ends are moved through the article moving assembly 26 and counted by the article counting system 96, they accumulate in the outflow area 24. As the can ends accumulate in the outflow area 24, it may be desirable to separate a group of can ends having a predetermined number of can ends therein from the outflow area 24. An article separator assembly 106 is provided with the present invention to separate a group of articles, indicated generally by the group of articles 108, from the stream of articles, indicated generally by reference numeral 110, passing through the article moving assembly 26. The article separator assembly 106 includes horizontal movement assembly 112, an actuation assembly 114 and a blade 116. The blade 116 is generally vertically (118) operated by the actuation assembly 114 to insert the blade 116 between neighboring can ends in the series of the can ends flowing through the stream 110.

The actuation assembly 114 and blade 116 are carried on the horizontal moving assembly 112 to move the group of can ends 108 contacted by the blade 116 away from the article moving assembly 26. A group of can ends 108 is moved from the outflow area 24 to a holding area 120 whereupon another shuttle or carriage device (not shown) may be used to transfer the group of can ends 108 into a can end bagging device or to a desired alternate path. The holding area 120 is of known construction including rigid side members 122 and skirts 124 of a rubber or other flexible material to retain a portion of the group 108 in an upright condition.

A leading end air holdup assembly 124 is used to holdup the leading can end of the group 108. The leading end air holdup assembly 124 is of known construction as set forth in U.S. Pat. No. 5,318,166 to Mojden et al. Mojden '166 was invented by one of the inventors of the present invention and is assigned to the same assignee of the present invention. In Mojden '166, air is driven against a leading end of a group of articles 108 to retain the leading end in an upright position relative to the series of article forming the group.

Figure 7:
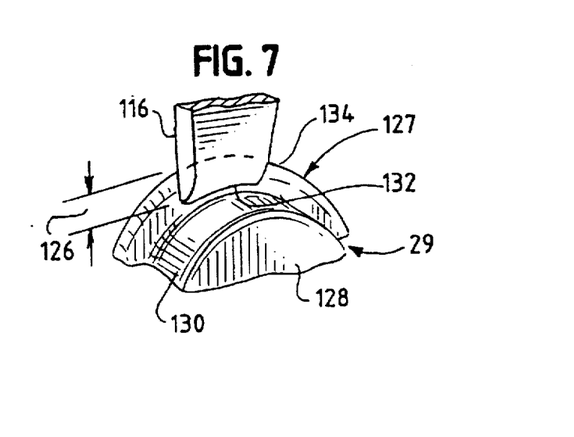
FIG. 7 is an enlarged, partial fragmentary, perspective view of an end of a knife blade of the article separating assembly illustrating the engagement of the blade with a corresponding portion of a disk-like article which is to be contacted and moved by the article moving assembly.

With further reference to FIGS. 2, 6 and 7, the blade 116 is inserted between neighboring can ends a dimension 126 (see FIG. 7) which is sufficient to contact an edge portion 127 of the can end 29. It is important to distinguish the separator assembly 106 of the present invention from that of the prior art devices. In the present separator assembly 106, the blade 116 is inserted only a sufficient dimension 126 to contact the edge portion 127. In this regard, the blade 116 does not contact a face 128 of the can end 29 and generally does not contact a rim 130 of the can end 29. Because the blade 116 only contacts an edge portion 127, it does not interfere with any structures or coatings on the face or rim 28, 130.

As more specifically shown in FIGS. 2, 6 and 7, the can ends 29 are generally circular having a convex arcuate edge portion 127. More specifically, the edge portion includes a lip 134 on the edge portion 127. The lip 134, often referred to as a curl, is a portion of the can end 29 which is mated with a container rim. The lip 134 extends away from the rim 130 a sufficient distance generally equal to or slightly greater than the dimension 126 which the blade 116 extends between neighboring can ends.

To further facilitate secure engagement of the trailing end can end 29, the blade 116 has a contoured tip 132 which generally corresponds to a contour of the edge portion 127. The contoured tip 132 is formed to accommodate the range of articles which may be moved through the article moving assembly 26. In this regard, the arcuate shape of the contoured tip 132 is formed to accommodate the largest diameter can end which will be moved through the article moving assembly 26. This will assure that the arcuate contoured edge 132 also will accommodate the smallest range without impinging against the rim 130 when it is inserted between neighboring can ends.

Use of the contoured tip 132 on the blade 116 generally corresponding to the contour of the lip 134 increases the contact area between the blade 116 and the lip 134. This increased contact area further facilitates secure engagement of the blade 116 against the trailing end can end to assure positive engagement and movement of the group 108 of can ends by the article separator assembly 116.

Further, with regard to accommodating a range of diameters of can ends, the actuation assembly 114 may be adjusted to control the depth of insertion of the blade 116 depending on the diameter of the can ends passing through the article moving assembly 26. This is accomplished because the actuation assembly 114 is generally an air cylinder of known construction or other similar device which will operate to provide controlled generally linear motion of the blade 116 relative to the series of can ends passing through the article moving assembly 26.

In use, the apparatus 20 of the present invention moves articles 29 from an inflow stream 22 along the path of travel 28 through the article moving assembly 28 to an outfeed area 24. The articles are counted as they pass through the article moving assembly 26 by the article counting system 96. Upon counting a predetermined number of can ends comprising a group 108, the article separator assembly 106 operates to separate the group 108 from the articles in the article moving assembly 26.

Articles are fed in a generally continuous stream 110 through a rod cage type of structure 136 generally of known construction. Articles are pulled from the stream 110 by the article moving assembly 26 which operates by rotating the rollers 46, 48. The rollers 46,48 have threads 50 which act to separate the can ends and create a gap between neighboring ones of the can ends moving through the path of travel. The counting system 96 having the sensor 100 and 104 coupled to the control device 96 counts the can ends moving through the article moving assembly 26.

The drive mechanism 44 is also coupled to the control device and likewise the article separator assembly 106 is coupled with the control device 98. As such, after a predetermined number of can ends 29 have moved through the article moving assembly 26, the drive mechanism 44 will be slowed thereby slowing the rotation of the shafts 36, 38 and the corresponding rollers 46, 48. The slowing of the rollers 46, 48 will allow for a slowing in the accumulation of can ends into a group 108 in the outfeed area 24. Slowing the accumulation of can ends allows for a dwell time in the gap between neighboring ends and thus allows for the actuation assembly 114 to insert the blade 116 in a desired gap without interfering with the movement or structure of can ends.

Once the actuation assembly 114 has moved the blade 116 into proper position, the horizontal moving assembly 112 is operated to shuttle the group 108 of can ends from the outfeed area 24 to the holding area 120. The actuation assembly 1 14 then retracts the blade 116 from the can ends and the horizontal moving assembly 112 returns the actuation assembly 114 and blade 116 to the outfeed area 24 for separating a subsequent group of ends.

When necessary, the article moving assembly 26 may be adjusted to accommodate a different can end diameter within a range of diameters. This adjustment is quickly and easily effected by operating the adjustment assembly 56. Operation of the adjustment assembly 56 includes loosening set fasteners 138, 140 on the bearing blocks 32, 34 to loosen the bearing blocks 32, 34 from the corresponding key blocks 76, 78. Upon slightly loosening the set fasteners 138, 140, the adjustment assembly 56 may be operated to rotate the screw 68 to drive the nut 62 therealong thereby moving (74) the bearing blocks 32,34 inwardly or outwardly relative to the central axis 58. Once a desired dimension is achieved between the rollers so that a can end having a predetermined dimension is retained between the threads 50 of the rollers 46, 48 the set fasteners 138, 140 are once again tightened. Tightening of the set fasteners 138, 140 securely clamps the bearing blocks 32, 34 with the corresponding key blocks 76, 78 to the base 60.

While a preferred embodiment of the present invention is shown and described, it is envisioned that those skilled in the art may devise various modifications and equivalents without departing from the spirit and scope of the appended claims. The invention is not intended to be limited by the foregoing disclosure.

The invention claimed is:

1. An apparatus for receiving a series of disk-like articles, said apparatus having an article moving assembly including a pair of spaced apart shafts, a drive mechanism coupled to said shafts for driving said shafts, said apparatus further comprising:

a base structure;

a pair of bearing blocks being adjustably positioned at spaced apart locations on said base, each of said shafts being rotatable retained in a corresponding one of said bearing blocks;

an adjustment assembly positioned relative to said base structure and coupled to both of said bearing blocks, said adjustment assembly having a drive device and a pair of linkages, each linkage being coupled to said drive device and to a corresponding one of said bearing blocks, said adjustment assembly providing relative movement of said bearing blocks for accommodating a range of dimensions of said disk-like articles with said article moving assembly;

a threaded nut coupled to said pair of linkages; and a threaded shaft engaged with said nut, said shaft being rotatably retained relative to said base for retaining said shaft against axial displacement while allowing axial rotation of said shaft for axially displacing s aid nut along said shaft for simultaneously moving said linkages and said bearing blocks coupled thereto.

2. An apparatus as recited in claim 1, further comprising:

said base having a pair of spaced apart keyways oriented generally perpendicular to said shaft retained on said base;

said bearing blocks having key portions engaged with a corresponding one of said pair of keyways in said base, said key portions engaged in said keyways limiting the movement of said bearing blocks in a direction generally perpendicular to said shaft.

3. An apparatus as recited in claim 1, said apparatus defining a path of travel through which said series of disk-like articles moves, said apparatus further comprising:

a counting system coupled to said apparatus for counting said disk-like articles moving through said apparatus, said counting system including an article moving assembly, said article moving assembly including a pair of rollers, each of said pair of rollers being retained at spaced apart locations for receiving said disk-like articles, and a drive mechanism rotating said rollers for driving said disk-like articles through said path of travel, a control device, and a rotation sensor positioned proximate to a portion of at least one of said rollers for detecting rotation of said at least one of said rollers, said rotation sensor being coupled to said control device, and whereby said rotation sensor detects the rotation of a portion of said corresponding one of said rollers, rotation of said roller being proportional to a number of said disk-like articles moving though said path of travel, said control device receiving a signal from said rotation sensor for counting said disk-like articles.

4. An apparatus as recited in claim 3, said counting system further comprising:

a motion sensor positioned proximate to said path of travel for sensing the presence and absence of said disk-like articles in said path of travel, said motion sensor being coupled to said control device.

5. An apparatus as recited in claim 4, said counting system further comprising:

said drive mechanism being coupled to said control device, said control device controllably operating said drive mechanism in response to the presence and absence of said disk-like articles in said path of travel.

6. An apparatus as recited in claim 5, further comprising:

said drive mechanism having a variable speed electric motor for controlling a flow rate of said series of disk-like articles moving through said path of travel.

7. An apparatus as recited in claim 1, said apparatus defining a path of travel through which said series of disk-like articles is advanced by said article moving assembly, said apparatus further comprising:

an article separator assembly for separating a group of articles from said series of disk-like articles moving through said path of travel, said article separator assembly including an actuation assembly; a blade attached to said actuation assembly, said actuation assembly controllably inserting said blade between neighboring ones of said series of articles, said blade having an insertion dimension sufficient to contact an edge portion of said neighboring articles, said insertion dimension being less than a radius of said disk-like articles.

8. An apparatus as recited in claim 7, further comprising:

said blade having a contoured tip generally corresponding to a contour of said edge portion of said disk-like articles.

9. An apparatus as recited in claim 8, further comprising:

said disk-like articles having a lip portion on said edge portion, said contoured tip of said blade corresponding to the contour of said edge portion for contacting and extending along said lip portion of said disk-like article for separating neighboring disk-like articles.

* * * * *